(12) United States Patent
Davis

(10) Patent No.: US 8,010,439 B1
(45) Date of Patent: Aug. 30, 2011

(54) SYSTEMS AND METHODS FOR ISSUING SECURITIES ON TAX-EXEMPT BONDS BASED ON A SINGLE TRUST

(75) Inventor: Clayton A. Davis, McLean, VA (US)

(73) Assignee: Federal Mortgage Home Loan Association, McLean, VA (US)

( * ) Notice: Subject to any disclaimer, the term of this patent is extended or adjusted under 35 U.S.C. 154(b) by 1373 days.

(21) Appl. No.: 10/785,415

(22) Filed: Feb. 25, 2004

Related U.S. Application Data

(60) Provisional application No. 60/449,578, filed on Feb. 26, 2003.

(51) Int. Cl.
*G06Q 40/00* (2006.01)

(52) U.S. Cl. .......... 705/37; 705/35; 705/36 R; 705/36 T

(58) Field of Classification Search ................ 705/36 R, 705/35
See application file for complete search history.

(56) References Cited

U.S. PATENT DOCUMENTS

| | | | |
|---|---|---|---|
| 7,266,524 B1* | 9/2007 | Butcher, III | 705/38 |
| 2002/0055897 A1* | 5/2002 | Shidler et al. | 705/35 |
| 2002/0065753 A1* | 5/2002 | Schloss et al. | 705/35 |
| 2002/0156719 A1* | 10/2002 | Finebaum et al. | 705/37 |
| 2002/0198808 A1* | 12/2002 | Myers | 705/35 |

OTHER PUBLICATIONS http://www.suntimes.com/business/savage/31460,cst-fin-terry-5.savagearticleBonds Copyrighted 2001.*
On the Valuation of Federal Loan Guarantees to Corporations Author(s): Howard B. Sosin Source: The Journal of Finance, vol. 35, No. 5 (Dec. 1980), pp. 1209-1221 Published by: Blackwell Publishing for the American Finance Association.*
"The Role of Insurance in Asset-Backed Securities" by Kotecha Jun. 12, 2000.*
"Mining and the vanishing Surety Bond Market" LA Kirschner, EB Grandy—Natural Resources and Environment, 2002—HeinOnline.*
"MBS Structring: Concepts and Techniques" by Gangwani. 1998.*
"The Role of Insurance in Asset-Backed Securities" by Kotecha Jun. 12, 2000.*
Private Placement Memorandum, Dec. 19, 2002, pp. 1-95.
Private Placement Memorandum Supplement, Dec. 19, 2002, pp. 1-30.

* cited by examiner

*Primary Examiner* — James A Kramer
*Assistant Examiner* — James A Vezeris
(74) *Attorney, Agent, or Firm* — Finnegan, Henderson, Farabow, Garrett & Dunner, LLP

(57) ABSTRACT

Disclosed are systems and methods for processing financial information such that securities backed by tax-exempt bonds may be issued. In one embodiment, the method includes establishing a senior class of securities, such that the senior class of securities includes a guarantee feature; establishing a junior class of securities, such that the junior class of securities serves as collateral for the senior class of securities; and issuing the senior and junior classes of securities, such that the junior and senior classes of securities are backed by assets of a single trust.

14 Claims, 7 Drawing Sheets

SYSTEMS AND METHODS FOR ISSUING SECURITIES ON TAX-EXEMPT BONDS BASED ON A SINGLE TRUST

CROSS REFERENCE TO RELATED APPLICATION

This application claims the benefit of U.S. Provisional Application No. 60/449,578, entitled "SYSTEMS AND METHODS FOR ISSUING SECURITIES ON TAX-EXEMPT BONDS BASED ON A SINGLE TRUST," filed Feb. 26, 2003, the disclosure of which is incorporated herein by reference in its entirety.

BACKGROUND OF THE INVENTION

I. Field of the Invention

The present invention generally relates to financial systems and to systems and methods for processing financial information. More particularly, the invention relates to systems and methods for issuing securities on tax-exempt bonds based on a single trust.

II. Background and Material Information

Many government entities have programs that issue bonds to finance multifamily housing. These multifamily bond programs serve the purpose of increasing the construction and rehabilitation of multifamily rental housing for families with limited incomes. The tax-exempt bonds (and corresponding promissory notes) provide below-market and market rate construction and permanent financing to the builders and developers of multifamily rental housing, which encourages the construction of affordable multifamily housing. These tax-exempt bonds also carry interest rates that are generally about 1.5 to 2.0 percentage points below taxable market rates.

In the past, in order to increase the investment opportunities in these tax-exempt bonds, certain financial institutions have provided "credit enhancement" for pools of bonds placed by their owner into grantor trusts. Such credit enhancement essentially involved the guarantee of scheduled principal and interest payments with respect to the bonds. Upon such enhancement, the trust would issue back to the bond owner trust receipts evidencing beneficial ownership in the enhanced bonds. The bond owner would then place such trust receipts in another, second, trust that would issue classes of senior and subordinate derivative securities backed, ultimately, by the enhanced bonds. The purchase price of the senior securities would be paid to the bond owner, which would use such proceeds to make additional investments in tax-exempt bonds, and the subordinate securities would be registered in the name of the bond owner, but pledged to the credit enhancer as security for the bond owner's obligation to reimburse the credit enhancer for payments made under its credit enhancement agreement. Under this structure, the owners of the senior derivative securities would have the right to tender or "put" their securities back to the trust for purchase upon seven day's notice. In order to provide money for the purchase of such securities, the trust would employ the services of a remarketing agent, which would attempt to remarket any securities so put. In order to guarantee the purchase of such securities in the event of a failed remarketing, the trust would also obtain a "liquidity facility" from the credit enhancer, which facility would essentially guarantee the availability of moneys to purchase the securities in the event that they could not be timely remarketed. The use of such complex trust arrangements would increase expenses, which results in lower returns to the bond owners and therefore decreased reinvestment in tax-exempt bonds.

SUMMARY OF THE INVENTION

Accordingly, the present invention is directed to systems and methods for processing financial information and, more particularly, systems and methods for issuing securities backed by tax-exempt bonds placed into a single trust.

A financial system consistent with the systems and methods of the present invention may, based on a single trust, establish, at a processor, a senior class of securities, such that the senior class of securities includes a guarantee feature; based on the single trust, establish, at the processor, a junior class of securities, such that the junior class of securities serves as collateral; and issue the senior class of securities and the junior class of securities, such that the junior and senior classes of securities are backed by the assets of a single trust.

Additional features and advantages of the invention will be set forth, in part, in the description which follows or may be learned by practice of the invention. The objectives and advantages of the invention may be realized and attained by the system and method particularly described in the written description and claims hereof as well as the appended drawings.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and aspects of the present invention and, together with the description, explain the principles of the invention.

In the drawings.

DETAILED DESCRIPTION

Reference will now be made in detail to the invention, examples of which are illustrated in the accompanying drawings. Wherever possible, the same reference numbers will be used throughout the drawings to refer to the same or like parts.

Figure 1:
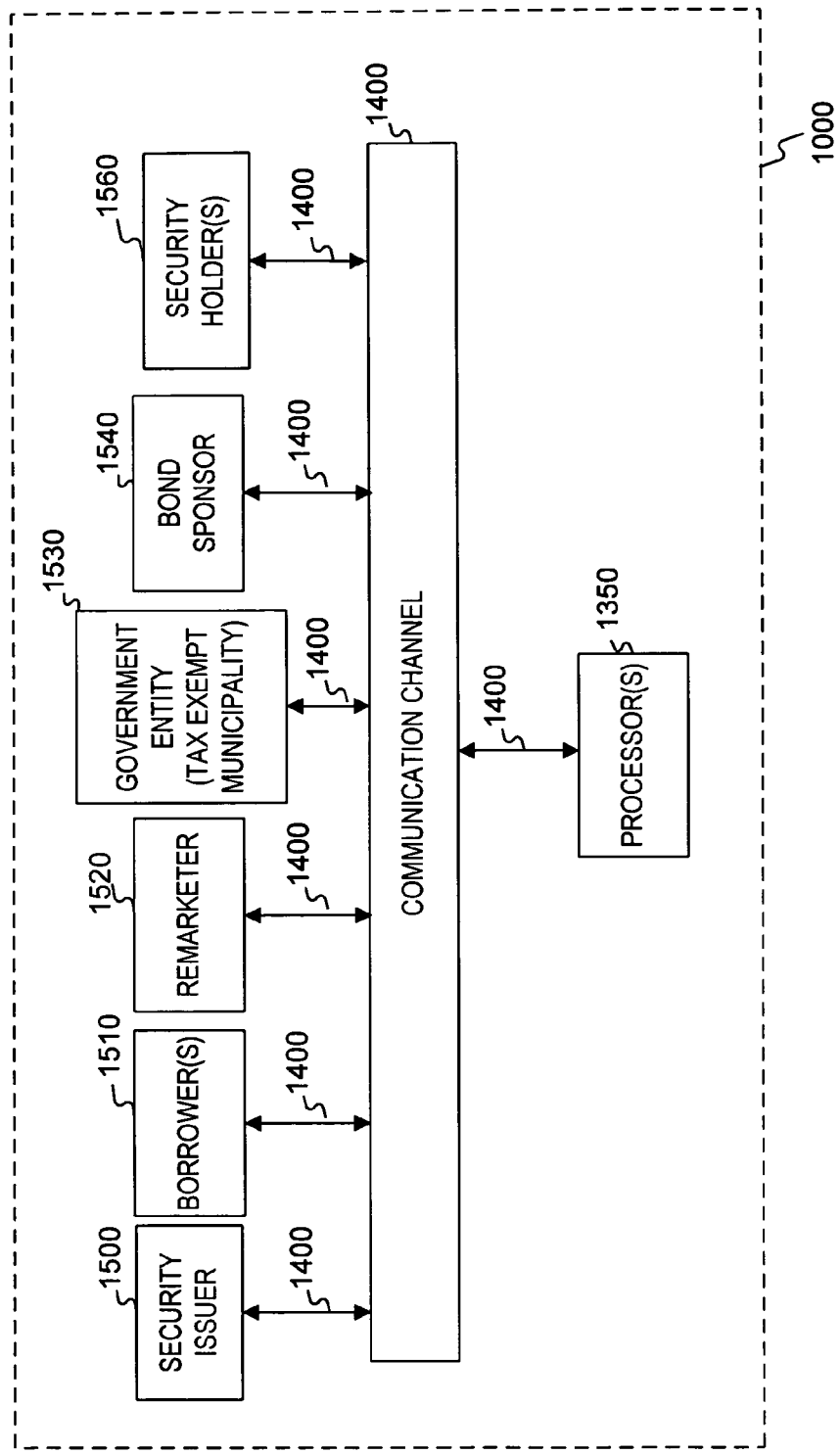
FIG. 1 illustrates an exemplary system environment in accordance with systems and methods consistent with the present invention.

FIG. 1 shows an exemplary system 1000 for issuing securities on tax-exempt bonds based on a single trust. Referring to FIG. 1, the system includes a communication channel 1400, a security issuer 1500, a borrower 1510, a remarketer 1520, a government entity 1530, a bond sponsor 1540, a security holder 1560, and a processor 1350.

Security issuer 1500 may include a single trust that holds tax-exempt bonds backed by multifamily housing assets. Moreover, security issuer 1500 may also include one or more processors, such as processor 1350. Security issuer 1500 may also issue senior securities and junior securities that are both based on the single trust. Furthermore, security issuer 1500 may issue the senior security with one or more guarantees to the buyer of the senior security, while the junior security may not include such guarantees. However, the junior security may serve as collateral in case of default. For example, the security issuer (or the trust) 1500 must pay on the guarantee (or promise) to the senior security and seek reimbursement for any payments from other sources, such as the holder of the junior securities.

In one embodiment, the guarantee is made by an entity other than the trust. When that is the case, that other entity must pay on the guarantee (or promise) to the senior security holder and seek reimbursement for any payments from other sources.

Securities represent an ownership interest in a stock or a bond and include, for example, tax-exempt securities. In one embodiment, securities are tax-exempt securities, such as securities associated with municipal bonds. When tax-exempt securities are used, the single trust is a pass-through partnership for tax purposes, and, as such, the interest payments made to the holders of the junior and senior securities are tax-exempt. Although senior and junior securities are described herein, more than two classes of securities (also referred to as tranches) may be used instead.

Although the single trust described above is an actual trust with a trust agreement, a trustee, and a beneficiary, other structures may be used instead that maintain the tax-exempt character of the bonds held in trust and/or the tax-exempt character of the interest paid by the bonds to the securities holders. For example, instead of depositing the tax-exempt bonds into a trust, a partnership (or virtual trust) may be used that holds the assets (or corpus) of the trust off balance sheet with its own taxpayer identification number and tax return, while still maintaining the tax-exempt status of the trust and the issued securities. When a single trust backs the junior and senior securities, it is the assets of the trust that back the junior and senior securities. Furthermore, although the above refers to the single trust holding the bonds directly, the single trust may, alternatively, hold one or more trust or custodial receipts evidencing beneficial ownership of bonds which have been aggregated through the use of a separate trust.

Governmental entity 1530 may include any city, county, or state government or its representative that issues tax-exempt bonds. The issuance of these tax-exempt bonds helps the government entity promote affordable multifamily housing. For example, the government entity issues tax-exempt bonds in return for money, which is used to fund loans to the developer(s) who builds and/or owns the multifamily housing. In this example, government entity 1530 serves as a mortgagee and serves as an issuer of the tax-exempt bonds to fund the mortgage to the developer. The tax-exempt bonds are secured by a lien on the multifamily housing. The developer or borrower 1510 then builds the multifamily housing and pays any mortgage payments to a servicer, such as a mortgage or bond servicer, (not shown) that makes any necessary payments to the owner(s) of the bonds.

The tax-exempt bonds issued by government entity 1530 may be purchased (or acquired) by bond sponsor 1540. Bond sponsor 1540 may be any individual or entity that either purchases the tax-exempt bonds or brokers the sale of the tax-exempt bonds. Although bond sponsor 1540 may sell the tax-exempt bonds, bond sponsor 1540 may also hold and accumulate tax-exempt bonds.

Security holder 1560 may include one or more buyers of the securities issued by security issuer 1500. Security holder 1560 may hold a senior security and/or a junior security. Moreover, security holder 1560 may receive income based on the security, such as periodic interest income and/or face value for the security when it is tendered for sale.

Remarketer 1520 (described in greater detail below) serves as a broker that finds a buyer when senior security holder 1560 intends to sell the tax-exempt security. If the security held by the security holder includes a liquidity guarantee, remarketer 1520 has a predetermined period of time (e.g., seven days) to find a new buyer for the security. Otherwise, the security issuer (or the trust therein) must purchase the security from security holder 1560.

Communication channel 1400 may include one or more mechanisms to facilitate an information exchange, and, more particularly may alone or in any suitable combination include a telephony-based network, a local area network (LAN), a wide area network (WAN), a dedicated intranet, the Internet, a wireless network, and/or a bus. Communication channel 1400 may further include any suitable combination of wired and/or wireless components and systems. Although communication channel 1400 is depicted in FIG. 1 as bi-directional, a skilled artisan would recognize that unidirectional communication links may alternatively be used instead.

Processor 1350 may include a computing platform and/or one or more databases, such that the processor 1350 may be capable of issuing tax-exempt securities, establishing a single trust, and/or administering a single trust. Security issuer 1500, borrower 1510, remarketer 1520, government entity 1530, bond sponsor 1540, and security holder 1560 may each include a processor similar to processor 1350 with a computing platform and/or a database.

Figure 2:
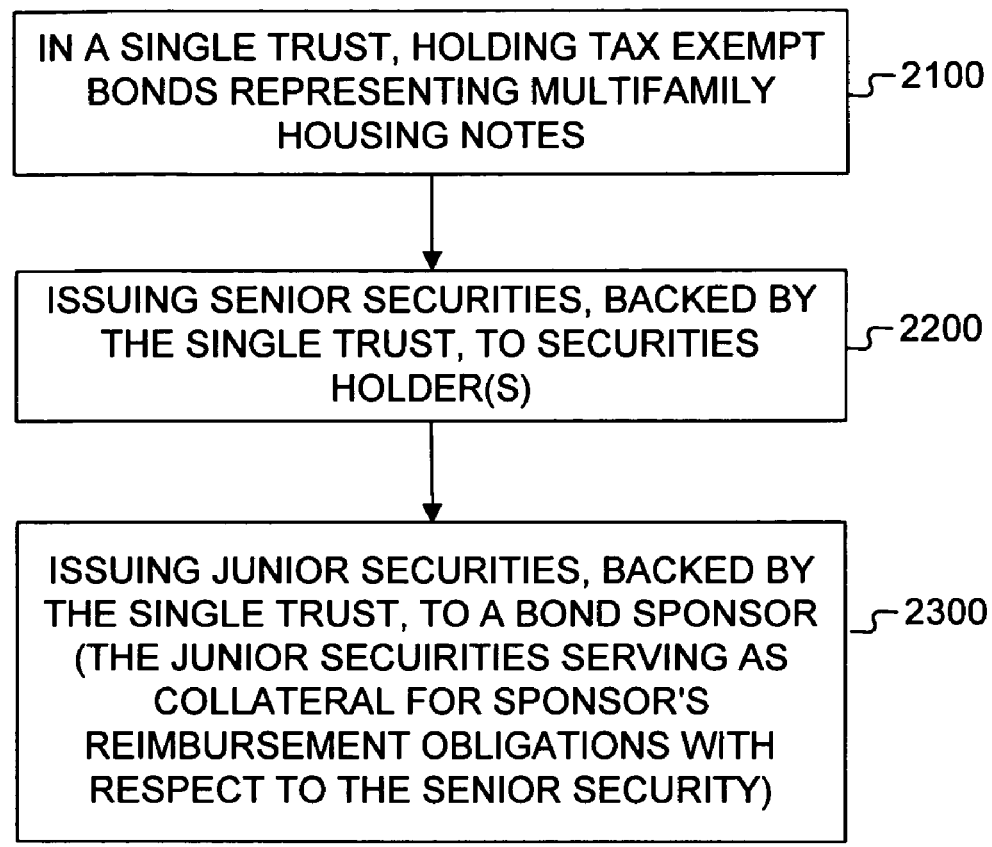
FIG. 2 is an exemplary flowchart for issuing securities backed by a single trust consistent with the systems and methods of the present invention.

FIG. 2 depicts an exemplary flowchart for issuing securities backed by a single trust. Security issuer 1500 may hold tax-exempt bonds in a single trust with the tax-exempt bonds backed by mortgage loans secured by multifamily housing (step 2100); issue senior securities to securities holders 1560, such that the senior securities are issued based on the single trust (step 2200); and issue junior securities to the bond sponsor 1540, such that the junior securities serve as collateral for the senior securities (step 2300).

Figure 3:
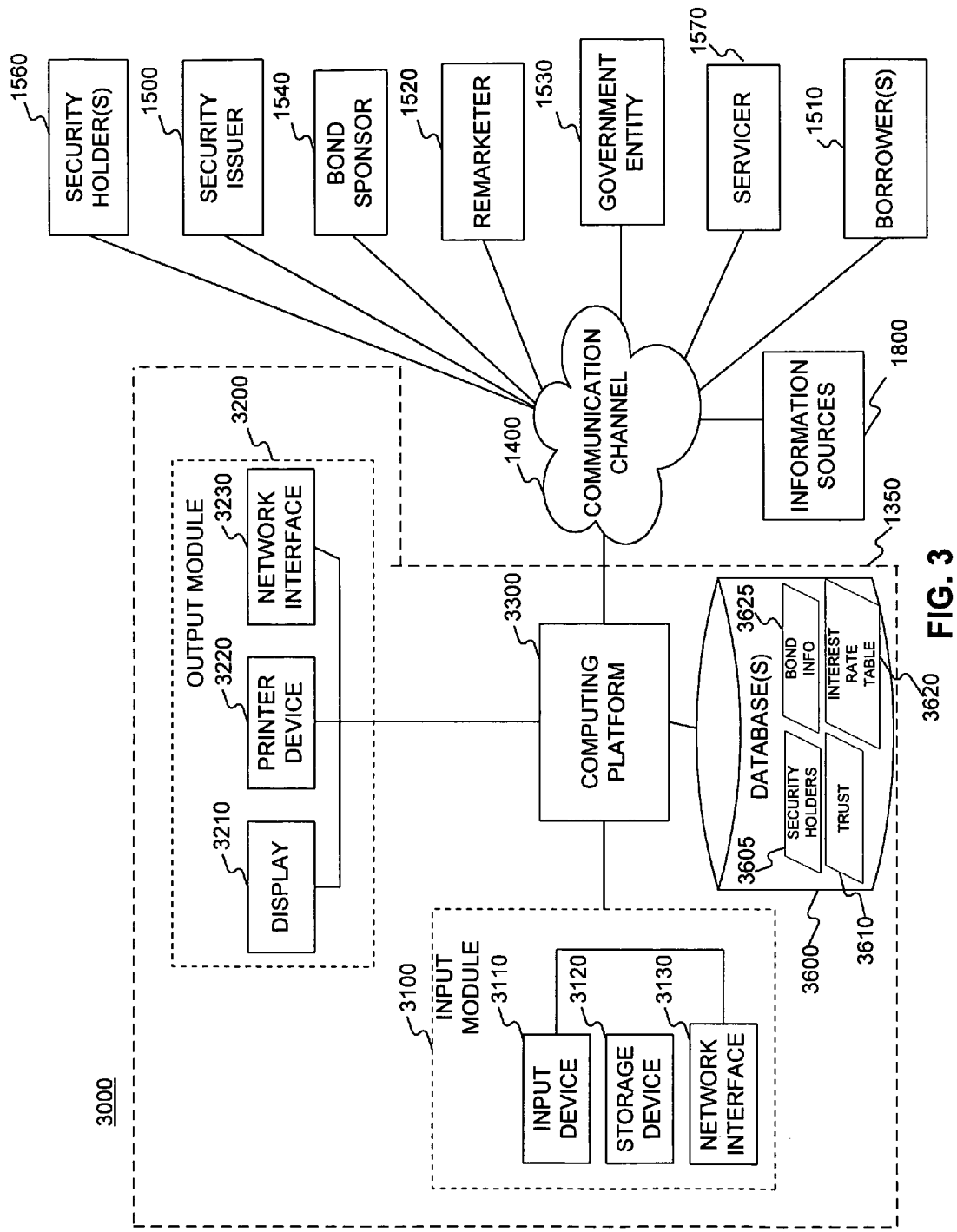
FIG. 3 illustrates another exemplary system environment in accordance with systems and methods consistent with the present invention.

FIG. 3 illustrates another exemplary system 3000 environment consistent with the systems and methods of the present invention. As illustrated in FIG. 3, system environment 3000 includes processor 1350, security issuer 1500, borrower 1510, remarketer 1520, bond issuer (e.g., a government entity or municipality) 1530, bond sponsor 1540, security holder 1560, and communication channel 1400. The processor 1350 may also include an input module 3100, an output module 3200, a computing platform 3300, and one or more databases 3600.

In one embodiment consistent with FIG. 3, the computing platform 3300 may include a data processor such as a PC, UNIX server, or mainframe computer for performing various functions and operations. Computing platform 3300 may be implemented, for example, by a general purpose computer or data processor selectively activated or reconfigured by a stored computer program, or may be a specially constructed computing platform for carrying-out the features and operations disclosed herein. Moreover, computing platform 3300 may be implemented or provided with a wide variety of components or systems including, for example, one or more of the following: central processing units, a co-processor, memory, registers, and other data processing devices and subsystems. Furthermore, although only a single processor is depicted in FIG. 3, multiple processors may by used, and such one or more processors may be located anywhere, including, for example, at one or more of the following: security issuer 1500, borrower 1510, remarketer 1520, bond issuer 1530, bond sponsor 1540, security holder 1560, and communication channel 1400.

Although the computing platform 3300 as shown in FIG. 3 connects to the security issuer 1500, borrower 1510, remarketer 1520, government entity 1530, bond sponsor 1540, and security holder 1560 through the communication channel 1400, computing platform 3300 may connect directly to entities 1500-1570 without departing from the spirit and scope of the invention.

Computing platform 3300 also communicates with input module 3100 and/or output module 3200 using connections or communication links, as illustrated in FIG. 3. Alternatively, communication between computing platform 3300 and input module 3100 or output module 3200 may be achieved using a network (not shown) similar to that described above for communication channel 1400. A skilled artisan would recognize that computing platform 3300 may be located in the same location or at a geographical separate location from input module 3100 and/or output module 3200 by using dedicated communication links or a network.

Input module 3100 may be implemented with a wide variety of devices to receive and/or provide information. Referring to FIG. 3, input module 3100 may include an input device 3110, a storage device 3120, and/or a network interface 3130. Input device 3110 may also include a keyboard, a mouse, a disk drive, telephone, or any other suitable input device for receiving and/or providing information to computing platform 3300. Although FIG. 3 only illustrates a single input module 3100, a plurality of input modules 3100 may also be used.

Storage device 3120 may be implemented with a wide variety of systems, subsystems and/or devices for providing memory or storage including, for example, one or more of the following: a read-only memory (ROM) device, a random access memory (RAM) device, a tape or disk drive, an optical storage device, a magnetic storage device, a redundant array of inexpensive disks (RAID), or any other device capable of providing storage or memory.

Network interface 3130 may exchange data between the communication channel 1400 and computing platform 3300 and may exchange data between input module 3100 and computing platform 3300. In one aspect of the invention, network interface 3130 may permit a connection to and data exchange with at least one or more of the following networks: an Ethernet network, an Internet protocol network, a telephone network, a radio network, a cellular network, or any other network capable of being connected to input module 3100.

Output module 3200 may include a display 3210, a printer 3220, and/or a network interface 3230. Further, the output from computing platform 3300 may be displayed or viewed through display 3210 (e.g., a cathode ray tube or liquid crystal display) and/or printer device 3220. For example, a trust agreement associated with a trust holding tax-exempt bonds may be viewed on display 3210 and/or printed on printer device 3220. Printer 3220 may print certificates (or other form of title) evidencing the ownership of tax-exempt bonds backed by securities. Network interface 3230 may provide (or transfer) payments to security holder 1560 and/or receive interest payments on the tax-exempt bonds held in trust. Moreover, network interface 3230 may exchange data between output module 3200 and computing platform 3300 and/or between computing platform 3300 and communication channel 1400. Network interface 3230 may be implemented as described above with respect to network interface 3130. Although FIG. 3 only illustrates a single output module 3200, a plurality of spatially separated output modules 3200 may be used.

Database 3600 may store any information to facilitate the issuance of securities backed by tax-exempt bonds including information describing trust 3610, security holders 3605, tax-exempt bonds 3625 held in the trust, and/or payment information (labeled interest rate table) 3620. For example, trust information 3610 may include information indicating the formation of the trust holding the tax-exempt bonds; information documenting the trust agreement, such as trust documents; information identifying the trustee; and/or other information identifying the corpus of the trust, e.g., the actual tax-exempt bonds held in the trust. Moreover, database 3600 may store information representing security holders 3605, such as information identifying the bond holder(s) or identifying the DTC numbers associated with the securities holders. The DTC (Depository Trust Corporation) serves as a trust (or account) where securities are kept (or deposited) in a street name or nominee account on behalf of the security holder (instead of providing the security holder with the actual "paper" security certificate).

Bond information 3625 may include any information identifying the corpus of the trust including the tax-exempt bonds themselves, any liens against those tax-exempt bonds, and any other information that identifies the tax-exempt bonds and their ownership. Furthermore, the payment information 3620 may include any information that facilitates the computation of payments to security holders and/or computation of interest income to the trust. For example, payment information 3620 may include a mechanism for determining the interest rates used in determining payments to the junior and senior securities and/or a mechanism for determining expenses (and/or fees) that are deducted from any payments made to junior and senior security holders. Although database 3600 is shown in FIG. 3 as being located with the computing platform 3300, a skilled artisan would recognize that the database(s) may be located anywhere (or in multiple locations) and connected to the computing platform via direct links or networks.

Figure 4:
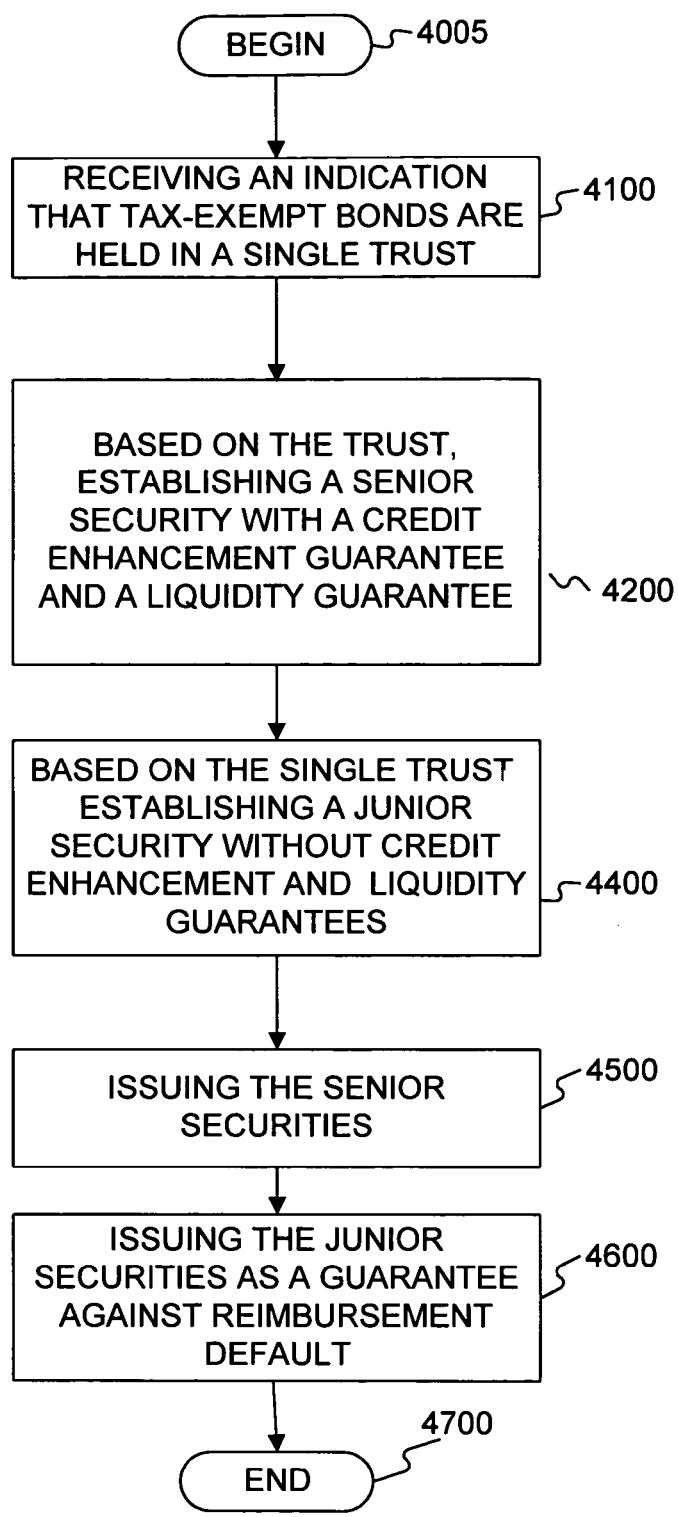
FIG. 4 is an another exemplary flowchart for issuing securities backed by a single trust consistent with the systems and methods of the present invention.

FIG. 4 depicts another flowchart for issuing securities based on a single trust of tax-exempt bonds. Security issuer 1500 (or a processor, such as processor 1350 therein) receives an indication that tax-exempt bonds are held in a single trust (step 4100); establishes a senior security based on the single trust, with the senior security including a credit enhancement guarantee and a liquidity guarantee (step 4200); establishes a junior security based on the single trust, with the junior security lacking a credit enhancement guarantee and a liquidity guarantee (step 4400); issues the senior security (step 4500); and issues the junior security as collateral against the default of the senior security (or its underlying assets, such as the tax-exempt bonds or the multifamily housing properties) (step 4600).

Processor 1350 may receive an indication through communication channel 1400 that tax-exempt bonds are held in a single trust (step 4100). The indication may include one or more of the following: receiving the identity of the trust administrator for the single trust holding tax-exempt bonds; receiving a trust agreement for the single trust holding tax-exempt bonds; receiving information identifying the assets (or corpus) of the trust, such as information identifying the tax-exempt bonds; receiving information indicating that security issuer 1500 purchased the tax-exempt bonds (i.e., the assets of the trust) from a bond sponsor 1540 or government entity 1530; receiving a tax-payer identification number for the single trust; and/or any other information representing the formation of a trust with a corpus of tax-exempt bonds.

To establish a senior security based on the single trust (step 4200), processor 1350 may determine a first portion (e.g., an amount of subordination) of the trust. For example, 80% of the single trust may be associated with one or more senior securities. Processor 1350 may then store an indication in database 3600 that 80% of the single trust backs the issuance of senior securities. Processor 1350 may also associate a credit enhancement guarantee and/or a liquidity guarantee with the senior securities. Database 3600 may then store an indication that the senior securities include the credit enhancement and/or liquidity guarantees. The credit enhancement guarantee means that if for any reason the tax-exempt bonds backing the senior securities default (e.g., when borrower 1510 stops making mortgage payments), the security issuer 1500 guarantees income, such as interest income, to the senior security holder. The liquidity guarantee means that if for any reason security holder 1560 wants to sell the security back to the trust and another buyer cannot be found, security issuer 1500 promises to buy the senior security from security holder 1560. For example, if security holder 1560 wants to sell the security and another buyer cannot be found within a predetermined time period, such as 7-days, security issuer 1500 promises to provide money for the purchase of the security from security holder 1560.

To establish a junior security based on the single trust (step 4400), processor 1350 may determine a second portion (e.g., an amount of subordination) of the trust. Returning to our example above, 20% of the single trust may be associated with junior securities. In one embodiment, although each of the senior securities includes guarantees (for credit enhancement and liquidity), the junior securities lack such guarantees. Instead, the junior securities serve as collateral in case the guarantees associated with the senior securities result in certificate issuer 1500 (or single trust) making a payment on any guarantees.

In one embodiment, the holder of the junior security, e.g., bond sponsor 1540, may receive any excess income, such as the spread between the interest rate paid to senior security holder(s) 1560 and the interest received on the tax-exempt bonds associated with the senior securities (less any fees and reimbursements to the trust). Moreover, database 3600 may store payment information 3620 including income information for the junior security holder and/or information indicating that a claim is made against one of the guarantees associated with the senior securities. When such a claim is made, the income to the junior security holders may be stopped until the security issuer (or trust) is reimbursed for any payments made under the guarantee(s).

To issue the senior security (step 4500), processor 1350 enables (or authorizes) the issuance of senior securities. For example, processor 1350 may indicate in database 3600 that senior securities have been authorized against the single trust and that the senior securities are associated with a percentage of the trust. The issuance of securities may also include the transfer of the security to a buyer of the security, i.e., security holder 1560. That transfer may be done by printing (using printer 3220) an ownership document, such as a security certificate. Alternatively, security ownership may be transferred through communication channel 1400 to DTC, such that the tax-exempt securities are kept (or deposited) in a street name or nominee account instead of the actual name of the security holder 1560. Although security issuer 1500 issues the securities, the issuance may be performed by a representative of security issuer 1500, such as a broker or bank, instead.

To issue a junior security (step 4600), processor 1350 may indicate in database 3600 that junior securities have been authorized against the single trust and that the junior securities are associated with a percentage of the trust. Moreover, database 3600 may store information indicating that the junior security serves as collateral against the default of the senior security (or its underlying assets). In one embodiment, the junior security is issued in certificated form, and is not held at DTC since the junior security is merely serving as collateral and is not sold to the public. The junior security is simply held to satisfy the credit and liquidity guarantees made with respect to the senior securities.

Figure 5:
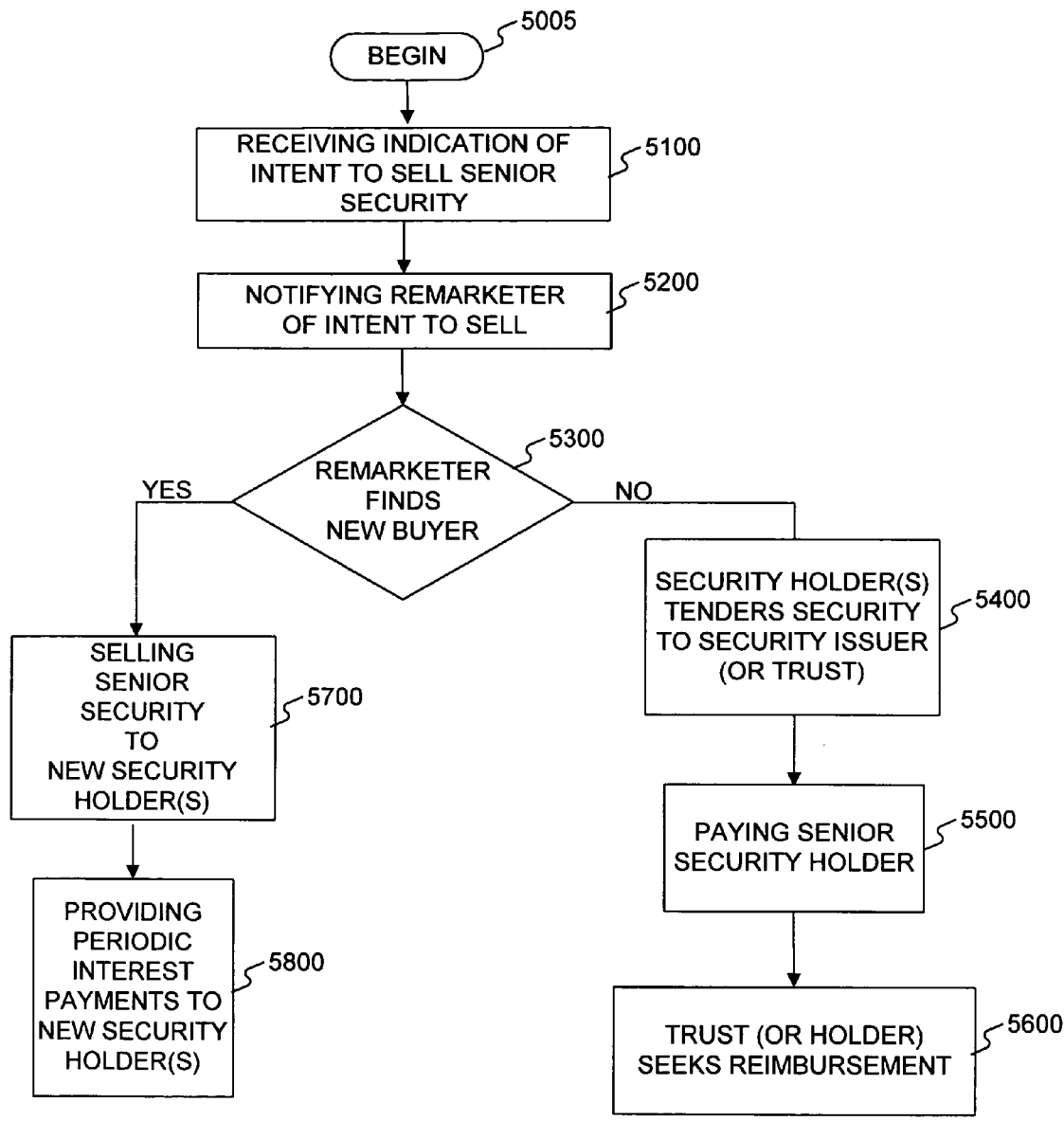
FIG. 5 is an another exemplary flowchart for remarketing securities when the security holder intends to sell the security in accordance with systems and methods consistent with the present invention.

FIG. 5 depicts another exemplary flowchart for remarketing securities when the security holder intends to sell the security. Security issuer 1500 receives an indication, such as a notice, of security holder's 1560 intent to sell the senior security (step 5100). Security issuer 1500 then notifies the remarketer 1520 to find a new buyer within a predetermined time as specified by the liquidity guarantee (step 5200). For example, a senior security with a 7-day put requires the remarketer to find a new buyer within 7-days (step 5300). If remarketer 1520 does not find a new buyer, the certificate holder tenders the security to the security issuer (or the trust therein) 1500 for payment (steps 5400-5500). Security issuer 1500 may then seek reimbursement from the trust or from income produced by the trust (step 5600). If remarketer 1520 does find a new buyer within the predetermined time, security holder 1560 sells the security to the new security holder (or to remarketer 1520 or security issuer 1500 serving as a broker) (step 5700). Security issuer 1500 then provides any future payments of interest income to the new security holder (step 5800).

Figure 6:
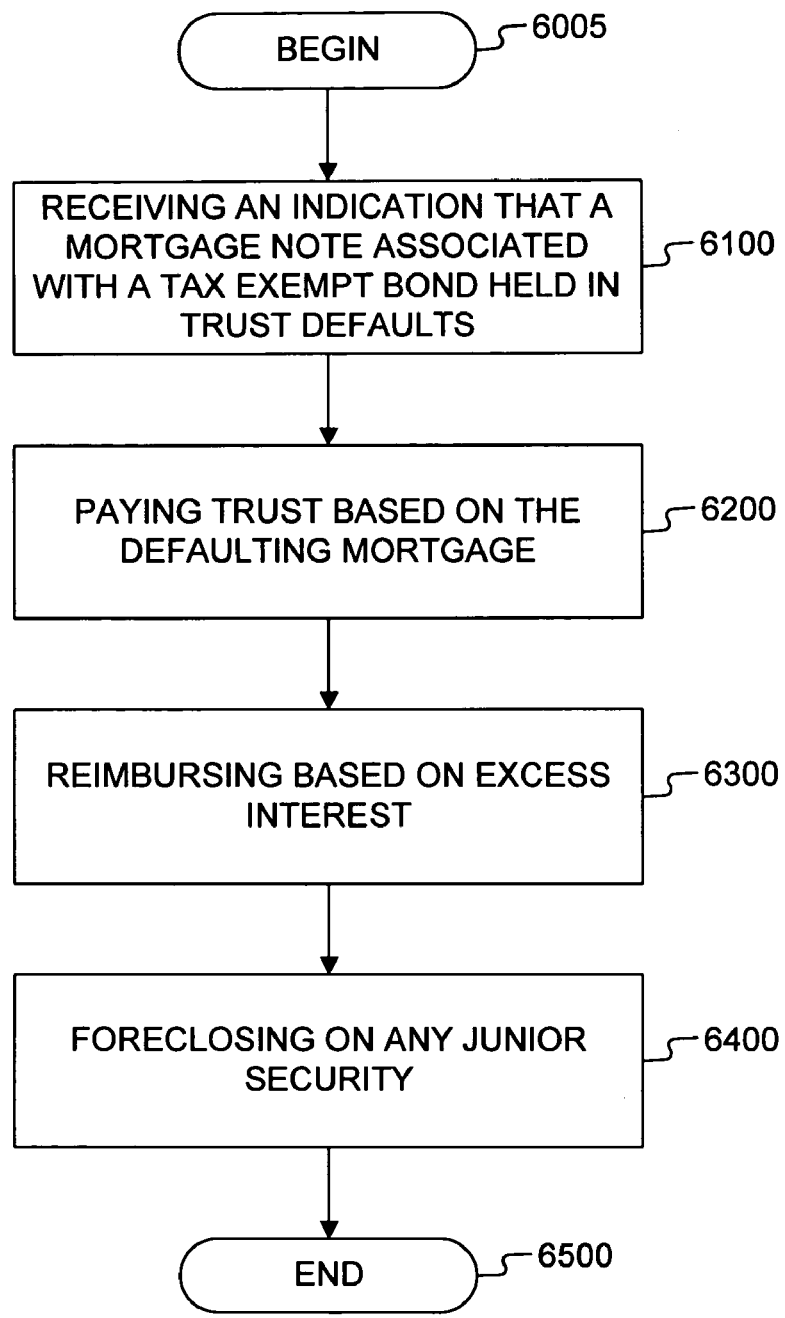
FIG. 6 is another exemplary flowchart depicting a default event consistent with the systems and methods of the present invention.

FIG. 6 depicts the steps associated with a default. Referring to FIG. 6, when a mortgage is in default and that mortgage corresponds to a tax-exempt bond held in the single trust (step 6100), security issuer 1500 may receive an indication that the default has occurred and may then reimburse the trust (or itself) to satisfy the default (step 6200). The security issuer may reimburse the trust through a variety of means including, for example, reimbursing the trust by diverting income (e.g., interest income) into the trust that would otherwise be paid to the junior security holder (step 6300) or foreclosing on the junior securities and receiving the proceeds (step 6400).

Figure 7:
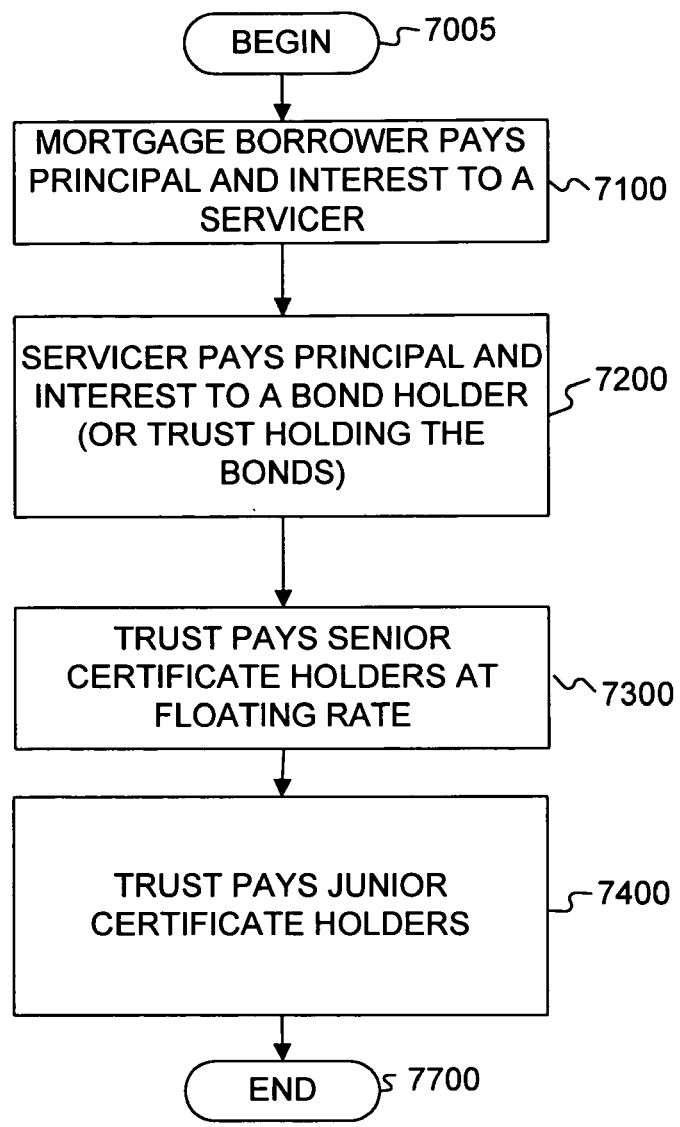
FIG. 7 is another flowchart depicting the flow of funds consistent with the systems and methods of the present invention.

FIG. 7 depicts the steps associated with payments made to and from the trust holding the tax-exempt bonds. Borrower 1510 makes periodic mortgage payments that include principal and interest to a servicer (step 7100). The servicer then pays security issuer 1500 (or the trust holding the tax-exempt bonds) a portion of the mortgage payments (step 7200). Security issuer 1500 then pays income to senior and junior security holders (steps 7300-7400). For example, the senior security holder may be paid income at a predetermined interest rate based on the value of the security, with the predetermined rate (fixed or variable) being stored in database 3600. In one embodiment of the invention, the interest rate is variable and set weekly. On the other hand, the junior security holder may be paid income at a predetermined interest rate based on the value of the security. In another embodiment, the interest rate for the junior security is determined by the following equation:

junior security interest rate=fixed value−senior security interest rate, where the fixed value can be any fixed value and the senior security interest rate is variable and set weekly. The equation above can float (or vary) according to the interest rate paid to the senior security holder. In an alternative embodiment, the interest payable to the junior security is equivalent to all interest received by the trust minus any (1) payments due to the senior securities, any (2) fees, (3) expenses, (4) escrows, and (5) reimbursements. For example, if the fixed value is "10%" and the variable rate is "1%," the junior security holder receives 9% interest (less any fees for the security issuer, servicer, etc.)

In one embodiment, the single trust includes tax-exempt bonds, such as multifamily housing bonds. Multifamily housing bonds may be issued by governmental organizations and entities. The governmental entities may include any city, county, or state government or its representative that issues tax-exempt bonds. The issuance of these tax-exempt bonds helps the government entity promote affordable multifamily housing. For example, the government entity issues tax-exempt bonds in return for money, which is used to make a mortgage loan to the developer(s) who builds and owns the multifamily housing. In this example, the government entity serves as an issuer of the tax-exempt bonds and also takes as collateral a mortgage loan secured by the multifamily housing. The developer (also a borrower) is obligated to repay the mortgage.

The tax-exempt bonds issued by the government entity are usually purchased (or acquired) by a bond sponsor. The bond sponsor may be any individual or entity that either purchases the tax-exempt bonds or brokers the sale of the tax-exempt bonds. Although the bond sponsor can sell the tax-exempt bonds, the bond sponsor may hold and accumulate tax-exempt bonds.

As the bond sponsor accumulates tax-exempt bonds to form a substantial pool of assets, the bond sponsor may want to sell the tax-exempt bonds to a security issuer, such that the securities issuer issues securities backed by the tax-exempt bonds. Although the tax-exempt bonds tend to be a fixed rate interest obligation, they can be put into a pool from which derivative securities may be sold as tax-exempt securities with guarantees and a weekly resetable interest rate.

In one embodiment, a bond sponsor accumulates 10 or more tax-exempt bonds with a total principal amount of $100 million or more. Security issuer 1500 may analyze the tax-exempt bonds; analyze the underlying real estate values; analyze the credit worthiness of the government entity; analyze the credit worthiness of the borrowers (e.g., the developers); analyze the credit market to determine whether or not the tax-exempt bonds are likely to perform (or sell) in the market place; analyze interest rates (e.g., weighted average interest rate and combined interest rate); analyze the combined debt coverage ratio of the income against payments due on the multifamily housing properties associated with the tax-exempt bonds; and analyze the value of the individual properties relative to the collective pool of properties associated with the tax-exempt bonds. Thus, security issuer 1500 may determine the default risk of the individual properties and the default risk of the pool. The default risks may be used to determine the size of the senior securities and the corresponding size of the junior securities. For example, 80% of the trust may be associated with the senior securities and 20% may be associated with the junior securities. However, if security issuer 1500 determines a relatively higher default risk, 75% of the trust may be associated with the senior securities and 25% may be associated with the junior securities. Moreover, the default risk may also be used to determine fees that will be charged by security issuer 1500.

After the junior portion and the senior portion are sized, a price is determined for the tax-exempt bonds. If bond sponsor 1540 agrees to the price, fees, and sizes, security issuer 1500 purchases the tax-exempt bonds. The purchased tax-exempt bonds may be deposited in a single trust. The single trust may issue a senior security that represents a percentage of the total bonds deposited into the single trust. As noted above, the senior securities may represent 80% of the total value of the single trust. The senior securities may include a credit enhancement guarantee, i.e., if the underlying mortgage defaults, the purchaser of the senior security is still paid any principal and interest payments. In one embodiment, the credit enhancement guarantee may be a guarantee to pay a weekly interest rate that is reset weekly. Furthermore, interest income is tax free to the securities holder since the interest income passes through a trust holding tax-exempt bonds. Moreover, the securities may also include a 7-day put guarantee. The 7-day put guarantee (also referred to herein as a liquidity guarantee) means that the security issuer (or the single trust) promises to buy back a put security from the security holder if a buyer cannot be found for the security in 7 days.

The single trust may issue a junior security that represents a percentage of the total bonds deposited into the single trust. For example, the junior securities may only represent 20% of the single trust. In one embodiment, the junior securities are not guaranteed. However, any income associated with the junior portion of the trust and any residual income (e.g., any amount remaining after payment of income to the senior securities holders less fees) are provided directly to the holder of the junior securities.

If the trust makes a disbursement based on a guarantee (e.g., a credit enhancement or liquidity guarantee), the security issuer (making the guarantee) may receive any income that would otherwise go to the junior security holder until the guarantee amount is satisfied.

Although the junior securities may be sold, the junior securities are preferably held by a pledge custodian to support the guarantees made to the holders of the senior securities. For example, the junior securities may be titled in the name of the junior security owner (e.g., the bond sponsor), but the junior securities would be subject to a pledge and security agreement to secure reimbursement obligations made to the security issuer in the event of a credit enhancement draw or a liquidity draw.

Although the bond sponsor is described as separate from the security issuer (or other entity making the guarantee), the bond sponsor and security issuer may be the same entity. Moreover, although the above refers to tax-exempt bonds and multifamily housing bonds, other taxable securities may be used instead.

The senior securities may include an interest rate swap, interest rate hedge, interest rate cap, and/or any other interest rate mechanism that prevents the interest rate associated with the senior securities to exceed the income associated with the tax-exempt bonds in the single trust.

The systems 1000 and 3000 may be embodied in various forms including, for example, a data processor, such as a computer that also includes a database. Moreover, the above-noted features and other aspects and principles of the present invention may be implemented in various environments. Such environments and related applications may be specially constructed for performing the various processes and operations of the invention or they may include a general-purpose computer or computing platform selectively activated or reconfigured by code to provide the necessary functionality. The processes disclosed herein are not inherently related to any particular computer or other apparatus, and may be implemented by a variety of mechanisms including any suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include for example machine code, such as produced by a compiler, and files containing a high level code that can be executed by the computer using an interpreter.

Turning to some of the nomenclature of the specification, the detailed description above is represented largely in terms of processes and symbolic representations of operations performed by conventional computer components, including a central processing unit (CPU), memory storage devices for the CPU, and connected pixel-oriented display devices. These operations include the manipulation of data bits by the CPU, and the maintenance of these bits within data structures reside in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

What is claimed is:

1. A computer-implemented method of processing financial information, said method comprising:
    receiving an indication, at a processor from a database, that tax-exempt bonds are in a single trust;
    based on the single trust, establishing, at the processor, a senior class of securities, such that the senior class of securities includes a guarantee feature, the guarantee feature indicating that a guarantee payment must be made to a holder of the senior class of securities on a guarantee claim and reimbursement sought after satisfying the guarantee claim;
    based on the single trust, establishing, at the processor, a junior class of securities, such that the junior class of securities serves as collateral;
    issuing the senior class of securities and the junior class of securities, such that the junior and senior classes of securities are backed by the assets of the single trust;
    paying excess income to holders of the junior class of securities until the guarantee claim is made;
    receiving a guarantee claim and, in response to the guarantee claim, stopping payment of the excess income to the holders of the junior class of securities;
    making the guarantee payment to the holder of the senior class of securities after receiving the guarantee claim; and
    seeking, by the single trust, reimbursement for the guarantee payment.

2. A system comprising:
    a computer processor and a memory;
    said processor configured to:
    receive an indication that tax-exempt bonds are in a single trust;
    based on the single trust, establish a senior class of securities, such that the senior class of securities includes a guarantee feature, the guarantee feature indicating that a guarantee payment must be made to a holder of the senior class of securities on a guarantee claim and reimbursement sought after satisfying the guarantee claim;
    based on the single trust, establish a junior class of securities, such that the junior class of securities serves as collateral;
    issue the senior class of securities and the junior class of securities, such that the junior and senior classes of securities are backed by the single trust; and
    pay excess income to holders of the junior class of securities until the guarantee claim is made;
    receive, at the single trust, a guarantee claim and, in response to the guarantee claim, stops payment of the excess income to the holders of the junior class of securities;
    make, by the single trust, the guarantee payment to the holder of the senior class of securities after receiving the guarantee claim; and
    seek, by the single trust, reimbursement for the guarantee payment.

3. A computer-implemented method comprising:
    based on a single trust and using a processor, establishing a senior class of securities, such that the senior class of securities includes a guarantee feature, the guarantee feature indicating that a guarantee payment must be made to a holder of the senior class of securities on a guarantee claim and reimbursement sought after satisfying the guarantee claim;
    based on the single trust and using the processor, establishing a junior class of securities, such that the junior class of securities serves as collateral;
    issuing the senior securities and the junior securities, such that the junior and senior classes of securities are backed by the assets of the single trust;
    paying excess income to holders of the junior class of securities until the guarantee claim is made;
    receiving a guarantee claim and, in response to the guarantee claim, stopping payment of the excess income to the holders of the junior class of securities;
    making the guarantee payment to the holder of the senior class of securities after receiving the guarantee claim; and
    seeking, by the single trust, reimbursement for the guarantee payment.

4. The method of claim 3, wherein establishing the senior class further comprises:
    using, as the single trust, a virtual trust.

5. The method of claim 3, wherein establishing the senior class further comprises:
    establishing the senior class, such that the senior class includes a liquidity feature.

6. The method of claim 3, wherein establishing the junior class further comprises:
establishing the junior class to serve as collateral for the senior class to satisfy the guarantee feature.

7. The method of claim 3, further comprising:
selling the senior class of securities.

8. The method of claim 3, further comprising:
holding, in the single trust, a plurality of tax-exempt bonds.

9. The method of claim 3, further comprising:
holding, in the single trust, interest in a plurality of tax-exempt bonds.

10. The method of claim 3, further comprising:
holding, in the single trust, a plurality of municipal bonds.

11. The method of claim 3, further comprising:
holding, in the single trust, a plurality of taxable bonds.

12. The method of claim 3, wherein establishing the senior class of securities comprises:
establishing the senior class by establishing a first percentage representative of securities that serve as the senior class and a second percentage representative of securities that serve as the junior class.

13. A system comprising:
a computer processor configured to establish, based on a single trust, a senior class of securities, such that the senior class of securities includes a guarantee feature, the guarantee feature indicating that a guarantee payment must be made to a holder of the senior class of securities on a guarantee claim and reimbursement sought after satisfying the claim;
the computer processor configured to establish, based on the single trust, a junior class of securities, such that the junior class of securities serves as collateral;
the computer processor configured to issue the senior class of securities and the junior class of securities, such that the junior and senior classes of securities are backed by the single trust; and
the computer processor configured to excess income to holders of the junior class of securities until the guarantee claim is made,
the computer processor configured to receive a guarantee claim, at the single trust, and in response to the guarantee claim, stop payment of the excess income to the holders of the junior class of securities;
the computer processor configured to make, by the single trust, guarantee payments to the holder of the senior class of securities after receiving the guarantee claim; and
the computer processor configured to seek, by the single trust, reimbursement for the guarantee payment.

14. A computer-readable medium containing instructions which, when executed by a data processor, perform a method, the method comprising:
based on a single trust, establishing a senior class of securities, such that the senior class of securities includes a guarantee feature, the guarantee feature indicating that a guarantee payment must be made to a holder of the senior class of securities on a guarantee claim and reimbursement sought after satisfying the guarantee claim;
based on the single trust, establishing a junior class of securities, such that the junior class of securities serves as collateral;
issuing the senior class of securities and the junior class of securities, such that the junior and senior classes of securities are backed by the single trust;
paying excess income to holders of the junior class of securities until the guarantee claim is made;
receiving a guarantee claim and, in response to the guarantee claim, stopping payment of the excess income to the holders of the junior class of securities;
making the guarantee payment to the holder of the senior class of securities after receiving the guarantee claim; and
seeking, by the single trust, reimbursement for the guarantee payment.

* * * * *